United States Patent [19]

Kakuda et al.

[11] Patent Number: 4,730,998

[45] Date of Patent: Mar. 15, 1988

[54] SCROLL-TYPE APPARATUS HAVING A PIVOTING MAIN JOURNAL BEARING

[75] Inventors: Masayuki Kakuda; Etsuo Morishita; Hiromu Narumiya, all of Amagasaki; Masahiro Sugihara, Wakayama; Tsutomu Inaba, Wakayama; Tadashi Kimura, Wakayama, all of Japan

[73] Assignee: Mitsubishi Denki Kabushiki Kaisha, Tokyo, Japan

[21] Appl. No.: 908,636

[22] Filed: Sep. 18, 1986

[30] Foreign Application Priority Data

Sep. 27, 1985 [JP] Japan ................ 60-215450

[51] Int. Cl.[4] .................. F01C 1/04; F01C 21/02; F16C 17/03
[52] U.S. Cl. ...................... 418/55; 418/57; 384/312
[58] Field of Search .............. 418/55, 57; 384/309, 384/312

[56] References Cited

U.S. PATENT DOCUMENTS

| | | | |
|---|---|---|---|
| 1,161,721 | 11/1915 | Parsons | 384/312 |
| 4,141,677 | 2/1979 | Weaver et al. | 418/6 |
| 4,431,388 | 2/1984 | Eber et al. | 418/55 |
| 4,473,343 | 9/1984 | Hazaki et al. | 418/55 |
| 4,580,911 | 4/1986 | Burkhard et al. | 384/309 |
| 4,597,676 | 7/1986 | Vohr et al. | 384/309 |

FOREIGN PATENT DOCUMENTS

| | | |
|---|---|---|
| 0078128 | 4/1983 | European Pat. Off. |
| 2230950 | 1/1973 | Fed. Rep. of Germany |
| 2709048 | 9/1978 | Fed. Rep. of Germany |
| 3109301 | 12/1981 | Fed. Rep. of Germany |
| 58-32988 | 2/1983 | Japan ................ 418/55 |
| 2121480 | 12/1983 | United Kingdom |

Primary Examiner—John J. Vrablik
Attorney, Agent, or Firm—Leydig, Voit & Mayer

[57] ABSTRACT

A scroll-type apparatus having a main journal bearing which journals the drive shaft of the apparatus and is capable of pivoting by small angles with two degrees of freedom. The main journal bearing comprises three or more arcuate pads whose inner surfaces journal the drive shaft and which are pivotably supported by a stationary main bearing housing. In a preferred embodiment, each of the pads has a spherical protrusion and two rotation-preventing pins secured to its back surface. The protrusions contact the inner surface of the main bearing housing and pivotably support the pads, while the rotation-preventing pins are inserted into grooves formed on the inner surface of the main bearing housing. When a load is applied to the drive shaft causing it to tilt, the pads of the main journal bearing can tilt along with the drive shaft by pivoting about the points of contact between the spherical protrusions and the inner surface of the main bearing housing, thereby preventing edge loading of the main journal bearing.

5 Claims, 5 Drawing Figures

SCROLL-TYPE APPARATUS HAVING A PIVOTING MAIN JOURNAL BEARING

BACKGROUND OF THE INVENTION

This invention relates to a scroll-type apparatus, and more particularly to a scroll-type compressor having a main journal bearing for the drive shaft of the compressor which is capable of pivoting by small angles.

In a conventional scroll-type compressor, the upper end of the drive shaft is usually journaled in a main journal bearing which is rigidly mounted in a stationary main bearing housing. During times other than during normal operation such as during start-up, the load on the compressor may greatly vary, and this load variation may cause the upper end of the drive shaft to tilt with respect to the longitudinal axis of the compressor. As the main journal bearing is stationary and is unable to tilt along with the drive shaft, the tilting of the drive shaft applies an undesirable edge load to the main journal bearing.

SUMMARY OF THE INVENTION

It is an object of the present invention to provide a scroll-type apparatus which can completely prevent edge loading of the main journal bearing for the drive shaft.

A scroll-type apparatus according to the present invention has a main journal bearing whose structure enables it to pivot with two degrees of freedom. Means are provided for pivotably supporting the main journal bearing so that when load variations cause the upper end of the drive shaft to tilt, the main journal bearing can tilt along with the drive shaft. As a result of the tilting, the bearing surface of the main journal bearing remains parallel to the drive shaft, and edge loading of the main journal bearing can be completely prevented.

In a preferred embodiment, the scroll-type apparatus is a compressor, and the main journal bearing comprises three or more arcuate pads which surround and journal the upper end of the drive shaft of the compressor. Means for pivotably supporting the main journal bearing so as to enable it to tilt comprise spherical protrusions which are formed on the outer surface of each pad and which contact the inner surface of a stationary main bearing housing, and a plurality of rotation-preventing pins which are formed on the outer surfaces of the pads and which loosely fit into grooves formed in the inner surface of the main bearing housing. The pads are able to pivot with two degrees of freedom about the points of contact between the protrusions and the inner surface of the main bearing housing.

BRIEF DESCRIPTION OF THE DRAWINGS

In all of the drawings, the same reference numerals indicate the same or corresponding parts.

DESCRIPTION OF THE PREFERRED EMBODIMENTS

Figure 1:
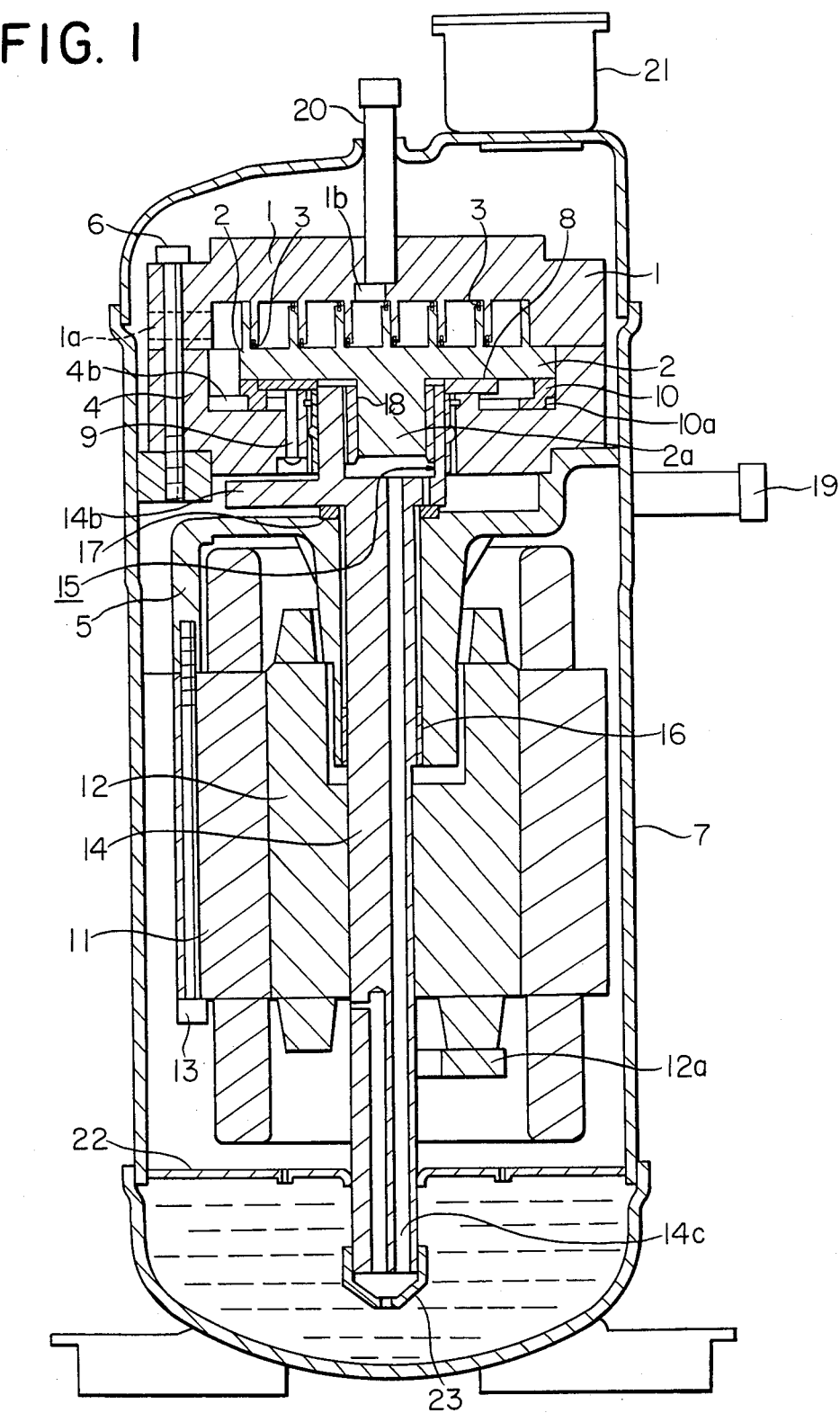
FIG. 1 is a longitudinal cross-sectional view of an embodiment of a scroll-type apparatus according to the present invention.
Figure 2:
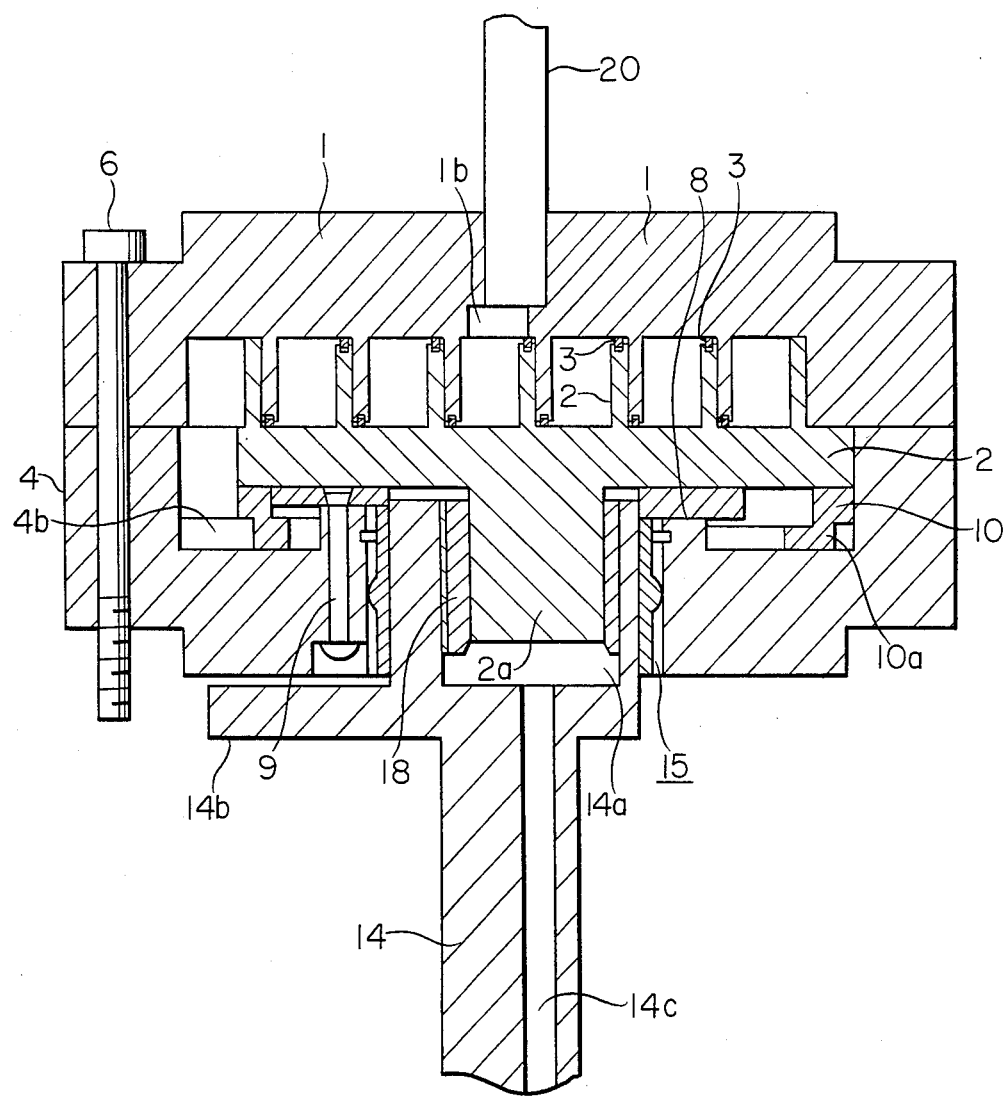
FIG. 2 is an enlarged cross-sectional view of the upper portion of the embodiment of FIG. 1.

Hereinbelow, an embodiment of a scroll-type apparatus according to the present invention will be described while referring to the accompanying drawings. In this embodiment, the scroll-type apparatus is a compressor, although it is also possible for the present invention to be employed as an expander, a pump, or an engine. As shown in FIG. 1, which is a longitudinal cross-sectional view of this embodiment, and in FIG. 2, which is an enlarged cross-sectional view of the upper portion of the same embodiment, the compressor has a stationary scroll 1 and a moving scroll 2 which is surrounded by and intermeshed with the stationary scroll 1. Each of the scrolls is of conventional shape, having a disk-shaped base plate which is parallel to the base plate of the other scroll and a spiral wrap which is formed on and extends perpendicularly from the base plate. The spiral wraps both have the shape of an involute of a circle or the like. When the scrolls are intermeshed with one another, a plurality of spiroidal compression chambers are formed between the spiral wraps of the scrolls. The end surface of the spiral wrap of each scroll is separated by a small gap from the surface of the base plate of the opposite scroll. The gaps between the spiral wraps and the base plates are filled by elastic seal members 3 which fit into grooves formed in the end surfaces of the spiral wraps. The elastic seal members 3 prevent the working fluid from leaking in the radial direction from one compression chamber to the adjoining one. The stationary scroll 1 has a radially-extending intake port 1a formed in its outer wall and a discharge port 1b formed in the center of its base plate. The moving scroll 2 has a short shaft 2a formed thereon which extends perpendicularly downwards from the bottom surface of its base plate.

The stationary scroll 1 is rigidly supported by a main bearing housing 4. The main bearing housing 4 has an annular ledge in its upper portion upon which the stationary scroll 1 sits and a hole in its center in which is supported a main journal bearing 15. The main bearing housing 4 is in turn supported by an auxiliary bearing housing 5. The stationary scroll 1 and the main bearing housing 4 are secured to the auxiliary bearing housing 5 by a plurality of bolts 6. The auxiliary bearing housing 5 is secured to the inner surface of a hermetically-sealed, metallic, three-piece shell 7 which completely encloses the compressor.

The moving scroll 2 is supported by an annular upper thrust bearing 8 which is secured to a ledge formed on the main bearing housing 4 by a plurality of pins 9. The upper thrust bearing 8 bears the weight of the moving scroll 2 as well as the force due to the pressure which develops within the compression chambers of the scrolls. The movable scroll 2 is connected with the main bearing housing 4 by an Oldham coupling which enables the movable scroll 2 to revolve about the center of the stationary scroll 1 without rotating about its own axis. The Oldham coupling comprises a ring 10 having two diametrically-opposed keys 10a formed on its bottom surface and two more unillustrated diametrically-opposed keys formed on its upper surface, the upper keys being displaced from the lower keys 10a and 90 degrees. The lower keys 10a are slidingly disposed in two keyways 4b formed in the main bearing housing 4, while the upper keys are slidingly disposed in unillustrated keyways formed in the lower surface of the base plate of the moving scroll 2.

The compressor is driven by an electric motor disposed below the auxiliary bearing housing 5. The motor comprises a stator 11 and a rotor 12 having a counterweight 12a formed on its lower end. The stator 11 is secured to the auxiliary bearing housing 5 by a plurality of bolts 13. Electric current is supplied to the motor via an electric terminal 21 which penetrates the upper portion of the shell 7 and is electrically connected to the motor by unillustrated leads.

The rotor 12 is secured to a longitudinally-extending drive shaft 14 which passes through its center and which transmits the power generated by the motor to the moving scroll 2. The upper end of the drive shaft 14 is journaled by the main journal bearing 15, while its middle portion is journaled by an auxiliary journal bearing 16 which is secured to the lower portion of the auxiliary bearing housing 5. Near the upper end of the drive shaft 14 is formed a counterweight 14b. The weight of the drive shaft 14 is supported by an annular lower thrust bearing 17 which is secured to the top of the auxiliary bearing housing 5. In the upper end of the drive shaft 14 is formed an eccentric hole 14a into which is inserted an eccentric bushing 18. The eccentric bushing 18 loosely fits inside the eccentric hole 14a so as to be able to rotate therein. The rotation of the eccentric bushing 18 is limited by an unillustrated rotation-limiting mechanism such as a pin which is secured to the drive shaft 14 and loosely fits into a suitable hole formed in the eccentric bushing 18. The shaft 2a of the movable scroll 2 loosely fits inside the eccentric bushing 18. When the moving scroll 2 is revolving about the stationary scroll 1, centrifugal force acts on the moving scroll 2, and this force exerts a moment on the eccentric bushing 18. This moment forces the eccentric bushing 18 to rotate inside the eccentric hole 14a of the drive shaft 14 until the spiral wrap of the moving scroll 2 firmly contacts the spiral wrap of the stationary scroll 1. As a result, the two spiral wraps are always pressed against one another, and leaks in the circumferential direction of the compressor are prevented.

Working fluid is introduced into the compressor via an intake pipe 19 which is secured to the shell 7 and opens onto the inside thereof. After passing through unillustrated channels formed in the auxiliary bearing housing 5, the working fluid enters the intake port 1a of the stationary scroll 1. The working fluid is discharged from the compressor through a discharge pipe 20 which penetrates the upper portion of the shell 7 and communicates with the discharge port 1b.

A foaming-preventing plate 22 is provided at the lower end of the shell 7. The space within the shell 7 below the foaming-preventing plate 22 is filled with lubricating oil and serves as a sump. The lower end of the drive shaft 14 is immersed in the sump, and a centrifugal pump 23 installed on the lower end of the drive shaft 14 pumps lubricating oil through a plurality of longitudinally-extending, eccentric oil supply holes 14c formed inside the drive shaft 14.

Figure 3A:
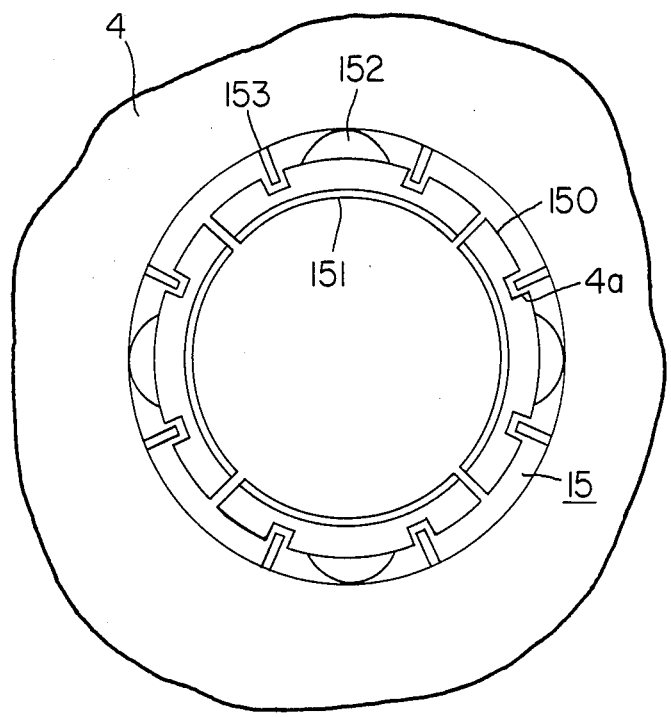
FIG. 3A is a plan view of the main journal bearing according to another embodiment of the present invention.
Figure 3:
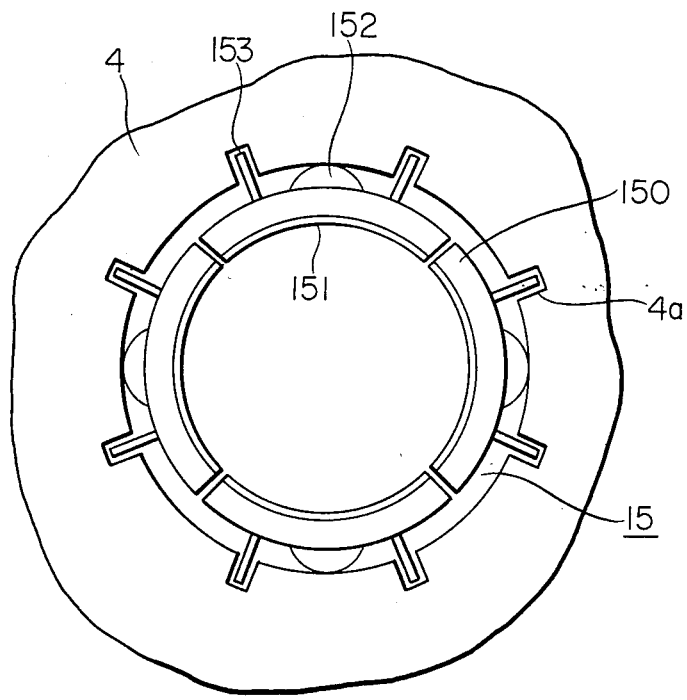
FIG. 3 is plan view of the main journal bearing of FIG. 2 when installed in the main bearing housing.
Figure 4:
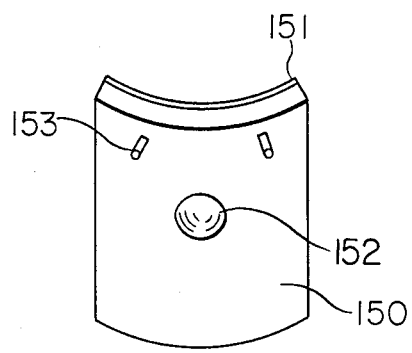
FIG. 4 is a perspective view of one of the pads of the main journal bearing of FIG. 3 as viewed from the outer side.
Figure 5:
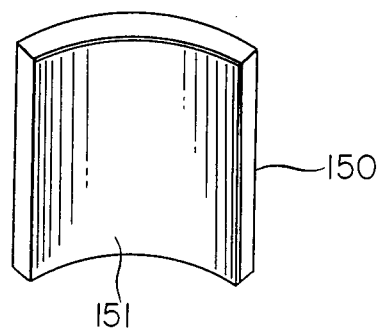
FIG. 5 is a perspective of the pad of FIG. 4 as viewed from the inner side.

The novel feature of the present invention is the structure of the main journal bearing 15 which enables it to pivot so that the bearing surface can always remain parallel to the surface of the drive shaft 14. The structure of the main journal bearing 15 is best shown in FIG. 3, which is a plan view of the bearing 15 when installed in the main bearing housing 4. It comprises a plurality of arcuate pads 150 which substantially surround the drive shaft 14, the transverse cross-sectional shape of each pad 150 being an arc of a circle. FIGS. 4 and 5 are perspective views of one of the pads 150 as seen from the outer side and the inner side, respectively. On the inner surface of each pad 150 is formed a lining 151 of bearing metal which journals the upper portion of the drive shaft 14. On the outer surface of each pad 150 is formed a spherical protrusion 152 which contacts the inner surface of the hole at the center of the main bearing housing 4. In addition, the outer surface of each pad 150 has two rotation-preventing pins 153 secured thereto which extend radially outwards towards the main bearing housing 4. The main bearing housing 4 has corresponding grooves 4a formed in its inner surface into which the rotation-preventing pins 153 loosely fit. The grooves 4a are made wide enough so that the pads 150 can pivot by small angles with two degrees of freedom. Namely, each pad 150 can pivot about a transverse axis which passes through the point of contact between the protrusion 152 and the inner surface of the main bearing housing 4 and is tangential to this inner surface, and it can pivot about a longitudinal axis which is parallel to the longitudinal axis of the compressor and which passes through the same point of contact. The rotation-preventing pins 153 prevent the pads 150 from rotating around the axis of the drive shaft 14 and also prevent the pads 150 from coming out of the main bearing housing 4. The protrusions 152 and the rotation-preventing pins 153 constitute means for pivotably supporting the main journal bearing 15 so that the bearing surfaces can be maintained parallel to the outer surface of the drive shaft 14.

The operation of this embodiment will now be explained. When the motor is energized, the drive shaft 14 is rotated by the rotor 12 of the motor. The rotation of the drive shaft 14 is transmitted to the shaft 2a of the moving scroll 2 by the eccentric bushing 18, and the moving scroll 2 is made to revolve about the center of the stationary scroll 1. As it revolves, it is guided by the Oldham coupling and is prevented from rotating about its own axis.

A fluid to be compressed enters the shell 7 via the intake pipe 19. Before entering the intake port 1a of the stationary scroll 1, it flows past the motor, cooling the stator 11 and the rotor 12. The fluid is drawn into the compression chambers formed between the two scrolls and is compressed by the rotation of the moving scroll 2 with respect to the stationary scroll 1. As it is compressed, it moves along a spiral path towards the center of the stationary scroll 1, where it reaches a maximum pressure. The fluid is then discharged from the scrolls via the discharge port 1b formed at the center of the stationary scroll 1 and passes out of the compressor through the discharge pipe 20. During normal operation, the longitudinal axis of the drive shaft 14 remains substantially parallel to the longitudinal axis of the compressor, and the main journal bearing 15 functions in the same manner as a conventional journal bearing. However, during startup and other times when the load applied to the drive shaft 14 by the moving scroll 2 greatly varies, the upper portion of the drive shaft 14 tends to tilt with respect to the longitudinal axis of the compressor. In a conventional scroll-type compressor with a stationary main journal bearing, this would produce edge loading of the main journal bearing, but in the present invention, each pad 150 of the main journal bearing 15 is able to pivot about the protrusion 152 formed on its outer surface. Therefore, when the upper end of the drive shaft 14 tilts, the pads 150 of the main journal bearing 15 tilt along with it, the inner surfaces of the pads 150 remain parallel to the outer surface of the drive shaft 14, and edge loading of the pads 150 is prevented.

Furthermore, the ability of each of the pads 150 to pivot about an axis parallel to the longitudinal axis of the compressor increases the load capacity of the main journal bearing 15 in the radial direction.

In the illustrated embodiment, the main journal bearing 15 comprises four pads 150, but it is possible to employ a different number of pads 150 and obtain the same effects. At least three pads are necessary, and it is desirable to have as many as possible.

Figure 3B:
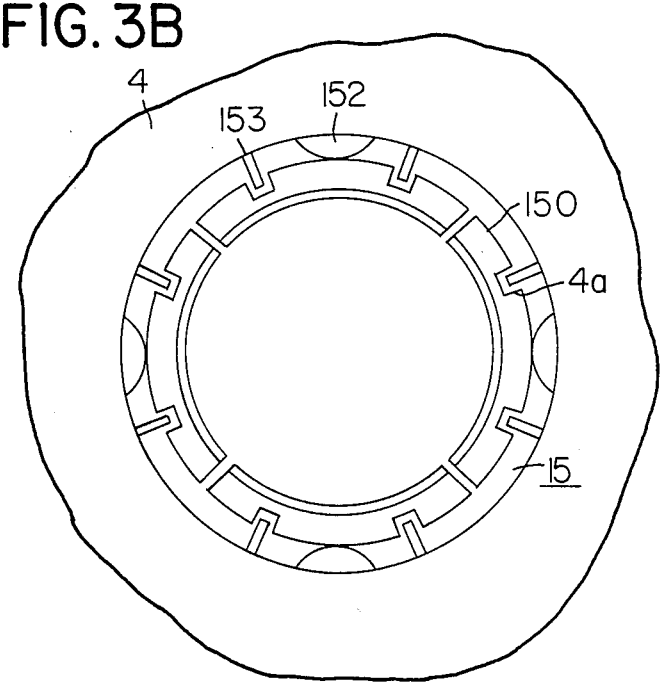
FIGS. 3B and 3C are views similar to FIG. 3A showing further embodiments of the invention.
Figure 3C:
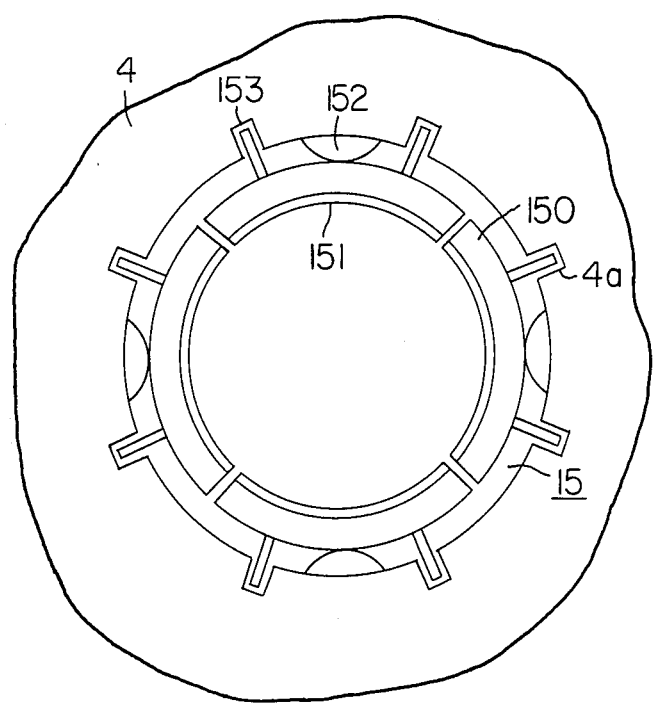

Furthermore, in the previous embodiment, protrusions 152 were formed on the outer surfaces of the pads 150, but spherical protrusions can instead be provided on the inner surface of the main bearing housing 4 with the outer surface of each pad 150 contacting a corresponding protrusion, as shown in FIGS. 3B and 3C. Similarly, if grooves are formed in the outer surface of the pads 150, it is possible to secure the rotation-preventing pins 153 to the inner surface of the main bearing housing 4 instead of to the outer surface of the pads 150, as shown in FIGS. 3A and 3B.

What is claimed is:

1. An improved scroll-type apparatus of the type having a stationary scroll, a drive shaft, a movable scroll intermeshed with said stationary scroll, a stationary main bearing housing having a hole formed in its center, a main journal bearing disposed in the hole in said main bearing housing for journalling said drive shaft and having an outer surface parallel to the surface of said drive shaft and spaced from to provide clearance with an inner surface of the hole in said housing, and means for drivingly connecting said drive shaft to said moving scroll so that said moving scroll revolves about a center of said stationary scroll without rotating about its own axis when said drive shaft is rotated, and means interposed in the clearance for pivotably supporting said main journal bearing so that its bearing surface remains parallel to the surface of said drive shaft when said drive shaft is caused to tilt within the clearance in response to variations in load applied to said drive shaft by said moving scroll.

2. An improved scroll-type apparatus as claimed in claim 1 wherein:
   the inner surface of the hole in said main bearing housing has a plurality of grooves formed therein;
   said main journal bearing comprises at least 3 arcuate pads which substantially surround said drive shaft, the inner surface of each of said pads being made of bearing metal; and
   said means for pivotably supporting said main journal bearing comprise a plurality of spherical protrusions equal in number to said pads and a plurality of rotation-preventing pins equal in number to said grooves, each of said pads having one of said protrusions and a plurality of said rotation-preventing pins secured to its outer surface, said pads being disposed in said hole of said main bearing housing such that said protrusions are located in the clearance and contact the inner surface of said hole and each of said rotation-preventing pins loosely fits into one of said grooves.

3. An improved scroll-type apparatus as claimed in claim 1 wherein:
   said main journal bearing comprises at least 3 arcuate pads whose inner surfaces comprise bearing metal;
   each of said pads has a plurality of grooves formed in its outer surface; and
   said means for pivotably supporting said main journal bearing comprise a plurality of spherical protrusions equal in number to said pads and a plurality of rotation-preventing pins equal in number to said grooves, said protrusions and said rotation-preventing pins being secured to the inner surface of said hole of said main bearing housing with each of said protrusions located in the clearance contacting the outer surface of one of said pads and each of said rotation-preventing pins loosely fitting into one of said grooves.

4. An improved scroll-type apparatus as claimed in claim 1 wherein:
   said main journal bearing comprises at least 3 arcuate pads which substantially surround said drive shaft, the inner surface of each of said pads being made of bearing metal;
   each of said pads has a plurality of grooves formed in its outer surface; and
   said means for pivotably supporting said main journal bearing comprise a plurality of spherical protrusions located in the clearance and equal in number to said pads and a plurality of plurality of rotation-preventing pins equal in number to said grooves, each of said pads having one of said protrusions secured to its outer surface, said rotation-preventing pins being secured to the inner surface of said hole of said main bearing housing, said pads being disposed in said hole such that said protrusions contact the inner surface of said hole and each of said rotation-preventing pins loosely fits into one of said grooves.

5. An improved scroll-type apparatus as claimed in claim 1 wherein:
   the inner surface of the hole of said main bearing housing has a plurality of grooves formed therein;
   said main journal bearing comprises at least 3 arcuate pads which substantially surround said drive shaft, the inner surface of each of said pads being made of bearing metal; and
   said means for pivotably supporting said main journal bearing comprise a plurality of spherical protrusions located in the clearance and equal in number to said pads and a plurality of rotation-preventing pins equal in number to said grooves, said protrusions being secured to the inner surface of said hole with each protrusion contacting the outer surface of one of said pads, each of said pads having a plurality of said rotation-preventing pins secured to its outer surface with each of said rotation-preventing pins loosely fitting into one of said grooves.

* * * * *